United States Patent
Pham et al.

(10) Patent No.: US 7,014,143 B2
(45) Date of Patent: Mar. 21, 2006

(54) AIRCRAFT LIGHTNING STRIKE PROTECTION AND GROUNDING TECHNIQUE

(75) Inventors: Doan D. Pham, Renton, WA (US); Mark W. Tollan, Puyallup, WA (US); Gregory R. Gleason, Seattle, WA (US)

(73) Assignee: The Boeing Company, Chicago, IL (US)

( * ) Notice: Subject to any disclaimer, the term of this patent is extended or adjusted under 35 U.S.C. 154(b) by 81 days.

(21) Appl. No.: 10/269,194

(22) Filed: Oct. 11, 2002

(65) Prior Publication Data

US 2004/0069895 A1 Apr. 15, 2004

(51) Int. Cl.
*H05A 3/00* (2006.01)

(52) U.S. Cl. .......................... 244/10; 244/119; 244/123
(58) Field of Classification Search .................. 244/10, 244/1 A, 119, 123; 361/218
See application file for complete search history.

(56) References Cited

U.S. PATENT DOCUMENTS

| | | | | |
|---|---|---|---|---|
| 3,989,984 A | * | 11/1976 | Amason et al. ............. | 361/218 |
| 4,352,142 A | * | 9/1982 | Olson ......................... | 361/218 |
| 4,411,380 A | * | 10/1983 | McWithey et al. | |
| 4,507,341 A | * | 3/1985 | Heseltine | |
| 4,542,056 A | | 9/1985 | Edwards et al. | |
| 4,623,951 A | * | 11/1986 | DuPont et al. .............. | 361/218 |
| 5,034,256 A | * | 7/1991 | Santiso et al. | |
| 5,111,354 A | * | 5/1992 | Marzi et al. ................. | 361/218 |
| 5,225,265 A | * | 7/1993 | Prandy et al. .............. | 244/1 A |
| 5,417,385 A | | 5/1995 | Arnold et al. | |
| 6,429,157 B1 | * | 8/2002 | Kishi et al. | |

FOREIGN PATENT DOCUMENTS

| | | |
|---|---|---|
| EP | 0 783 960 A | 7/1997 |
| FR | 2 626 629 A | 8/1989 |

OTHER PUBLICATIONS

Lightning Strike Products, Sep. 2002, XP–002270680.

* cited by examiner

*Primary Examiner*—Michael J. Carone
*Assistant Examiner*—L. Semunegus
(74) *Attorney, Agent, or Firm*—Ann Gailbraith

(57) ABSTRACT

An aircraft panel assembly 10 is provided, including a panel core 28, a plurality of pre-preg layers 30 surrounding the panel core 28 forming an internal layer of plies 34, at least one metal foil layer 38 positioned on an outer layer 40 of the internal layer of plies 34. The at least one metal foil layer 38 providing an electrical conduit between the outer surface 24 of the aircraft panel assembly 10 and a sub-structure 26 for grounding.

19 Claims, 1 Drawing Sheet

AIRCRAFT LIGHTNING STRIKE PROTECTION AND GROUNDING TECHNIQUE

TECHNICAL FIELD

The present invention relates generally to aircraft surfaces to more particularly to aircraft control surfaces with lightning strike protection.

BACKGROUND OF THE INVENTION

Modern aircraft are commonly designed to utilize composite structures and to incorporate a variety of high tech electronics. Although these improvements to traditional aircraft design have resulted in a wide variety of benefits to the aircraft industry, these same benefits can leave modern aircraft vulnerable to traditional concerns such as lightning strikes. Modern aircraft electronics can be damaged and malfunction if improperly exposed to the high power electricity of continual lightning strikes. Similarly, composite control surfaces, without proper grounding technology, can experience structural damage in the event of lightning strike. Therefore, the ability of an aircraft designed to withstand and tolerate lightning strikes is a significant advantage to the airline industry.

One approach to lightning strike prevention has been the use of an expanded aluminum mesh placed on the outside of the composite lay-up on an aircraft's outer surface. Aluminum grommets are commonly utilized to provide a ground path between the expanded aluminum mesh and the underlying structure. This provides a conductive path for a lightning to travel from the outer surface of the aircraft's control surfaces to the underlying structure without damage to the composite control surfaces. Although this methodology has proven successful, it carries with it undesirable increases in manufacturing time and material cost. The use of extended aluminum mesh, therefore, leaves considerable room for improvement in the protection of composite control surfaces from lightning strikes.

It would therefore be highly desirable to have an aircraft composite surface that provided lightning strike protection similarly to known methodologies while reducing manufacturing time and material cost to produce. It would further be highly desirable to develop a method for producing such reduced cost and improved aircraft structural panels that could be utilized with an aircraft design to improve lightning strike protection.

SUMMARY OF THE INVENTION

It is therefore an object to the present invention to provide an aircraft panel structure with improved lightning strike protection. It is a further object to the present invention to write a composite surface with lightning strike protection that might be produced with improved manufacturing time and material costs.

In accordance with the objects of the present invention an aircraft panel assembly is provided. The aircraft panel assembly includes a honeycomb core surrounded by a plurality of inner filler ply layers and a plurality of inner pre-preg layers. The present invention further includes at least one metal foil layer placed on the outer layer of the plurality of inner filler ply layers and inner pre-preg layers. The present invention further includes an outer surface skin applied over at least one metal foil layer.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
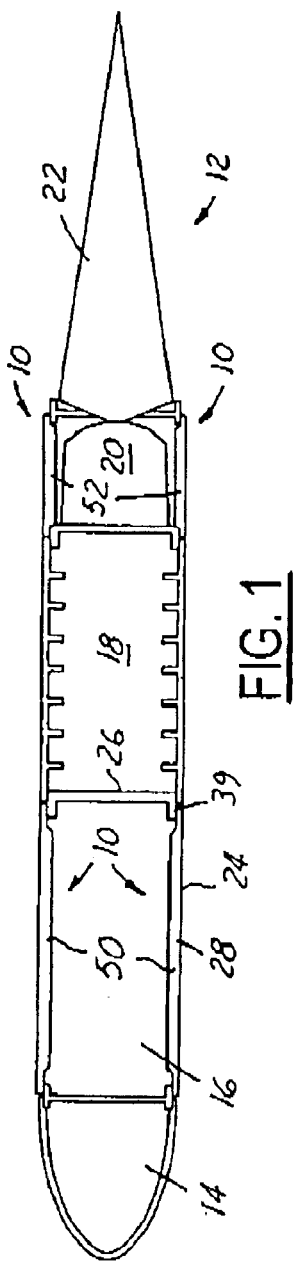
FIG. 1 is an illustration of an aircraft panel assembly with lightning strike protection in accordance with the present invention, the aircraft panel assembly illustrated position within an aircraft stabilizer structure for illustrative purposes.

Referring now to FIG. 1, which is an illustration of an aircraft panel assembly 10 in accordance with the present invention, the aircraft panel assembly 10 illustrated in position within an aircraft structure 12. It should be understood that although the aircraft structure 12 is illustrated as a stabilizer structure, it is contemplated that the aircraft panel assembly is intended for use in a wide variety of aircraft structures 12. The aircraft structure 12 illustrated includes a leading edge 14, a forward box 16, a main box 18, a trailing edge 20, and a flight control surface 22. In the event of a lightning strike, in order to prevent damage to the aircraft structure 12 or internal electronic devices (not shown) it is desirable to allow the electricity to flow from the outer surface 24 of the aircraft structure 12 to the sub-structure 26 where it can be grounded. Prior art methodologies utilized expensive expanded mesh (not shown) and the installation of aluminum grommets (not shown) to provide a path for current flow and grounding to the substructure 26.

Figure 2:
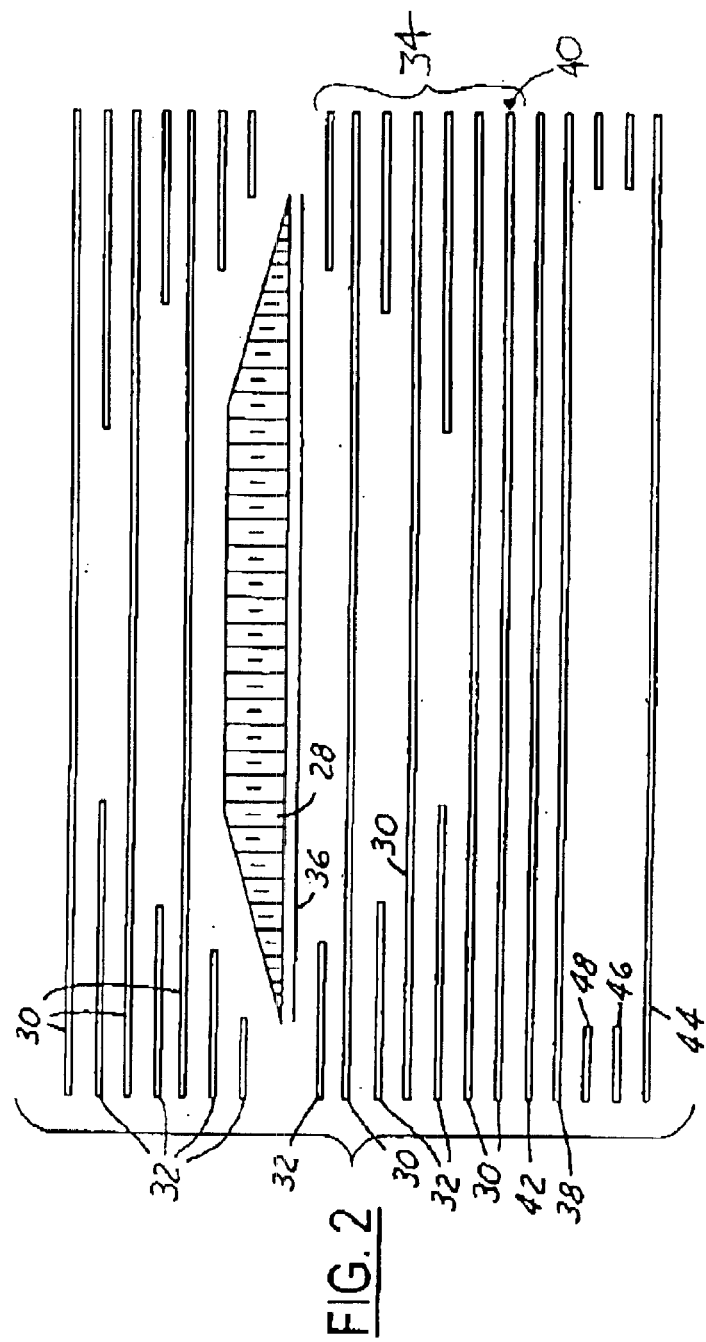
FIG. 2 is a detailed cross-sectional illustration of the aircraft panel assembly illustrated in FIG. 1.

The present invention provides an economical solution to the grounding problem as illustrated in FIG. 2. The aircraft panel assembly 10 illustrated includes a panel core 28. Panel cores 28 are well known in the aircraft industry and can be formulated out of a variety of materials in a variety of forms. Although a diverse grouping of panel cores 28 are contemplated, the embodiment illustrated contemplates the use of a honeycomb core. The panel core 28 is covered with a plurality of layers of pre-preg material 30 and filler plies 32 forming an internal layer of plies 34. Although a variety of pre-preg materials 30 are contemplated, one embodiment contemplates the use of BMS 8-79, a fiberglass pre-preg fabric. Alternate styles of pre-preg material 30 may be used in substitution or combination, including but not limited to, style 7781 and Style 220. Furthermore, fiber direction of the pre-preg material 30 may be varied including, but not limited to, 0/90 deg, +/−45 deg, and 0 deg. An inner adhesive layer 36, such as a film adhesive BMS 5-129, may be positioned between the panel core 28 and the first layer of pre-preg material.

The present invention further includes at least one metal foil layer 38 positioned on the outer ply layer 40 of the internal layer of plies 34. Although the metal foil layer 38 may be attached to the outer ply layer 40 in a variety of fashions, one embodiment contemplates the use of an intermediate adhesive layer 42 positioned between the outer ply layer 40 and the metal foil layer 38. It is contemplated that the metal foil layer 38 may be comprised of a wide variety of metal foils. One embodiment, however, contemplates the use of PAA treated 3003 H-19 aluminum foil formed in approximately 0.008 inch. Although the metal foil layer 38 may be applied such that it completely surrounds the internal layer of plies 34, such an application may be unnecessary as only a single surface of the aircraft panel assembly 10 may be exposed to potential lightning strikes. In this situation, only one surface of the aircraft panel assembly 10 need be covered so long as the metal foil layer 38 extends to provide electrical contact between the outer surface 24 and a substructure contact surface 39 (see FIG. 1).

It is further contemplated that an outer surface skin 44 may be applied onto the metal foil layer 38 for protective purposes. The outer surface skin 44 may be comprised of a variety of materials that allow current from a lightning strike to pass through to the metal foil layer 38. In one embodiment, the outer skin surface 44 is contemplated to comprise a layer of adhesive. In an alternate embodiment, the outer surface skin 44 is contemplated to comprise Loctite Synskin. The present invention can further include a periphery pre-preg layer 46 and a periphery adhesive layer 48 to further protect the metal foil layer 38 and prevent delamination or damage to the metal foil layer 38. Although the periphery pre-preg layer 46 and the periphery adhesive layer 48 may be applied in a variety of fashions, one embodiment contemplates positioning these layers 46,48 in between the metal foil layer 38 and the outer surface skin 44.

Although it is contemplated that the aircraft panel assembly 10 may be used in a variety of places throughout aircraft construction, one embodiment contemplates the use as a forward box panel 50 (see FIG. 1) and specifically the empennage forward box panel. It is contemplated that it may also be used on the trailing edge 52. Although these particular uses have been described, it should be understood that the technology described by the present application is applicable to a wide range of aircraft surfaces in a wide variety of locations.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An aircraft panel assembly comprising:
   a panel core;
   a plurality of pre-preg plies applied to said panel core forming an internal layer of plies, said plurality of pre-preg plies including an outer ply layer;
   at least one metal foil layer permanently applied to said outer ply layer of said internal layer of plies, said at least one metal foil layer providing an electrical conduit between an outer surface and a sub-structure contact surface of the aircraft panel assembly; and
   an outer surface skin applied to said at least one metal foil layer, said at least one metal foil layer positioned between said outer surface skin and said outer ply layer, said outer surface skin allowing current to pass through to said at least one metal foil.

2. An aircraft panel assembly as described in claim 1, wherein said outer surface skin comprises a composite surfacing film.

3. An aircraft panel assembly as described in claim 1, wherein said outer surface skin comprises adhesive.

4. An aircraft panel assembly as described in claim 1, further comprising:
   a periphery pre-preg layer applied between said outer surface skin and said at least one metal foil layer.

5. An aircraft panel assembly as described in claim 1, wherein said panel core comprises a honeycomb core.

6. An aircraft panel assembly as described in claim 1, further comprising:
   a plurality of filler ply layers positioned between said panel core and said at least one metal foil layer.

7. An aircraft panel assembly as described in claim 1, further comprising:
   an intermediate adhesive layer positioned between said internal layer of plies and said at least one metal foil layer.

8. An aircraft panel assembly as describe in claim 1, wherein said at least one metal foil layer comprises an aluminum foil.

9. An aircraft structure assembly comprising:
   a sub-structure;
   at least one aircraft panel assembly having an outer surface and a sub-structure contact surface, said at least one aircraft panel assembly comprising:
   a panel core;
   a plurality of pre-preg plies applied to said panel core forming an internal layer of plies, said plurality of pre-preg plies including an outer ply layer;
   at least one metal foil layer permanently applied to said outer ply layer of said internal layer of plies, said at least one metal foil layer providing an electrical conduit between said outer surface and said sub-structure contact surface such that current received during a lightning strike is transferred from said outer surface to said substructure; and
   an outer surface skin applied to said at least one metal foil layer, said at least one metal foil layer positioned between said outer surface skin and said outer ply layer, said outer surface skin allowing current to pass through to said at least one metal foil.

10. An aircraft structure assembly as described in claim 9, wherein said outer surface skin comprises a composite surfacing film.

11. An aircraft structure assembly as described in claim 9, wherein said outer surface skin comprises adhesive.

12. An aircraft structure assembly as described in claim 9, further comprising:
   a periphery pre-preg layer applied to said at least one metal foil layer.

13. An aircraft structure assembly as described in claim 9, wherein said panel core comprises a honeycomb core.

14. An aircraft structure assembly as described in claim 9, further comprising:
   a plurality of filler ply layers positioned between said panel core and said at least one metal foil layer.

15. An aircraft structure assembly as described in claim 9, further comprising:
   an intermediate adhesive layer positioned between said internal layer of plies and said at least one metal foil layer.

16. An aircraft structure assembly as described in claim 9, wherein said at least one aircraft panel assembly comprises a forward box panel.

17. An aircraft structure assembly as described in claim 9, wherein said at least one aircraft panel assembly comprises a trailing edge panel.

18. A method of preventing damage from current generated by a lightning strike on an aircraft structure assembly including a sub-structure and an aircraft panel assembly comprising:
   transferring the current from the lightning strike from an outer surface to the sub-structure including:
   transferring the current through an outer surface skin of the aircraft panel assembly to at least one metal foil layer, said at least one metal foil layer permanently positioned over a plurality of pre-preg plies covering a honeycomb core; and
   transferring the current from said at least one metal foil layer to the sub-structure.

19. An aircraft panel assembly comprising:
   a panel core;
   a plurality of pre-preg plies permanently applied to said panel core forming an internal layer of plies, said plurality of pre-preg plies including an outer ply layer;

at least one metal foil layer applied to said outer ply layer of said internal layer of plies, said at least one metal foil layer providing an electrical conduit between an outer surface and a sub-structure contact surface of the aircraft panel assembly;

an outer surface skin applied to said at least one metal foil layer, said at least one metal foil layer positioned between said outer surface skin and said outer ply layer, said outer surface skin allowing current to pass through to said at least one metal foil; and a periphery pre-peg layer applied between said outer surface skin and said at least one metal foil layer.

* * * * *